United States Patent

[11] 3,523,496

[72] Inventor Hubert Nerwin
Rochester, New York
[21] Appl. No. 650,293
[22] Filed June 30, 1967
[45] Patented: Aug. 11, 1970
[73] Assignee Eastman Kodak Company
Rochester, New York
a Corp. of New Jersey

[54] PRELOADED FILM MAGAZINE WITH LIGHT SEALING WEB
8 Claims, 3 Drawing Figs.
[52] U.S. Cl. .................................................. 95/31
[51] Int. Cl. ......................................... G03b 19/04
[50] Field of Search ........................................ 95/31, 67;
352/72-78

[56] References Cited
UNITED STATES PATENTS
3,384,318  5/1968  Nerwin et al .............. 242/71.1

| 2,114,638 | 4/1938 | Parker .................... | 95/67 |
| 2,591,417 | 4/1952 | Frye ...................... | 95/31 |
| 2,933,027 | 4/1960 | Hollingworth et al ....... | 95/31 |
| 2,983,462 | 5/1961 | Berlings .................. | 95/31UX |
| 3,138,084 | 6/1964 | Harvey ................... | 95/31 |
| 3,276,340 | 10/1966 | Nerwin ................... | 95/31 |
| 3,402,650 | 9/1968 | Hoadley .................. | 95/31X |

Primary Examiner— Norton Ansher
Assistant Examiner— David S. Stallard
Attorney— Robert W. Hampton and Malcolm G. Dunn ABSTRACT: A photographic film magazine having a supply chamber and a take-up chamber with a rotatable take-up spool. The magazine is inserted in a camera transversely to the camera picture taking axis, and one end wall of the magazine has peripheral lip means that cooperate with corresponding slot means in the camera to form a lighttight closure between the magazine and the camera. The magazine further may be provided in the film passageways of both chambers with a predetermined pattern of surface irregularities to reduce reflection of light into the film chambers.

Patented Aug. 11, 1970

3,523,496

HUBERT NERWIN
INVENTOR.

Malcolm J. Dunn
BY
Robert W. Hampton

ATTORNEYS

PRELOADED FILM MAGAZINE WITH LIGHT SEALING WEB

The present invention relates to photography and more particularly to cameras and film magazines for use therein.

Cameras using expendable film magazines have been well known for many years and have become increasingly popular with the advent of improved plastic molding techniques and materials enabling such magazines to be produced accurately and inexpensively. Typically, such magazines comprise a casing defining a lighttight film supply chamber housing a strip of coiled film extending therefrom into a second casing defining a lighttight film take-up chamber which includes a rotatable core on which the film is wound by the film advance mechanism of the camera to bring successive areas into exposure position between the two casings. In cameras of 35mm size or larger using such magazines, the portion of film between the casings is usually supported in the focal plane of the camera lens or objective by film guide means incorporated in the magazine itself, with light sealing means being provided between the film guide portion of the magazine and the adjacent camera structure so that the exterior portions of the magazine itself need not be shielded from light when the magazine is installed in the camera.

However, in similar magazines such as those used in so-called sub-miniature cameras of 16mm size or smaller, the film usually is not supported by the magazine structure between the two casings, but is received laterally between appropriate guide surfaces at the focal plane of the camera lens when the magazine is installed in the camera. Since the portion of film between the two casings is entirely unprotected by the magazine, it has been necessary, heretofore, for the magazine to be completely enclosed within the camera to exclude light from the unexposed areas of film advanced into exposure position between the chambers. This requirement complicates the construction of the camera by necessitating a lighttight cover door. This requirement also precludes the possibility of having an exterior portion of the magazine exposed to view when the camera is loaded to identify the type of film in the camera and to provide exposure information by means of appropriate visible indicia on the magazine.

Accordingly, a primary object of the present invention is to eliminate the necessity for a lighttight cover door on a camera adapted to employ the latter type of magazines, by providing the camera and magazine with cooperating means for excluding light from the interior camera chamber accommodating the magazine film casings and the intermediate portion of film when the camera is loaded. Such a construction also allows the realization of another important object of the invention, namely, to permit direct viewing by the photographer of an indicia bearing portion of the magazine even when the magazine is positioned in a camera and the camera cover member is closed.

Still another important object of the invention is to improve the labyrinth passageway means by which light is excluded from the film supply and take-up chambers of the magazine to protect the film therein when the magazine is removed from the camera, such improvement also being applicable to other types of film magazines.

These and other objects of the invention will be apparent from the following description, reference being made to the accompanying drawings in which.

Figure 2:
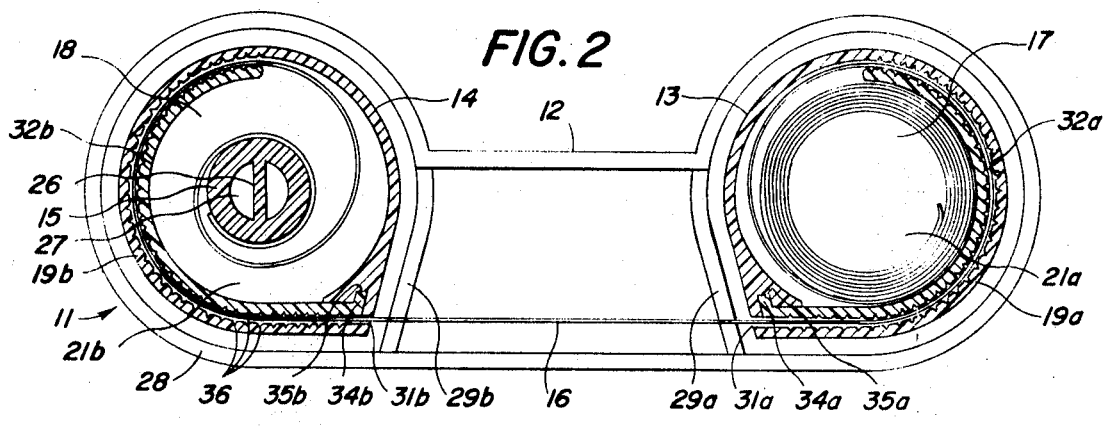
FIGURE 2 is an enlarged bottom sectional view of the film magazine illustrated in FIGURE 1, showing the construction of the film casings and the light sealing means employed therein.

The film magazine 11, shown in the drawings, preferably is formed of molded plastic components comprising a rigid, light impermeable top wall member 12, a film supply casing member 13 and a film take-up casing member 14 enclosing a rotatable film winding core 15. As best shown in FIGURE 2, an elongate film strip 16 is initially coiled about an axis within the film supply chamber 17 defined by a generally cylindrical wall surface of the casing member 13 and extends into the film take-up chamber 18 defined by a generally cylindrical wall surface of said casing member 14, wherein the end of the film strip is attached to the winding core 15.

Figure 3:
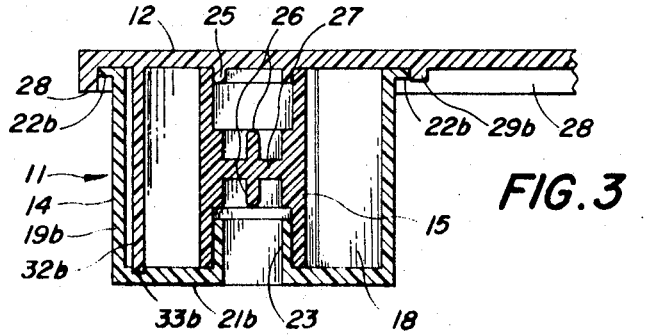
FIGURE 3 is a partial front cross-sectional view taken through the film take-up casing of the film magazine shown in FIGURES 1 and 2, with the film strip omitted for purposes of clarity.

The end portions of the film magazine defining the film supply chamber and the film take-up chamber are substantially allochiral, with corresponding elements thereof being identified in the drawings by the same numeral followed by the suffix "a" or "b" to designate the film supply and film take-up structures, respectively. The film take-up casing member 14 includes a curved outer wall member 19b contiguous with a bottom wall member 21b and is provided at its upper, open end with a peripheral flange 22b. As shown in FIGURE 3, a tubular core support member 23 centrally located on bottom wall member 21b serves to provide a lighttight support for the rotatable film winding core 15, the top end of which is similarly supported by a tubular projection 25 on wall member 12.

To simplify assembly of the magazine, by obviating endwise orientation of the film winding core, symmetrical transverse key members 26 are provided along its axis of rotation on opposite sides of a central web 27. Thus, whichever way the core is placed in the magazine, a key member is accessible through the tubular core support member 23, by a film winding member of the camera, as will be described later. As will also be explained in greater detail, the wall member 12 of the magazine is provided with a surface lateral to the top surface and defining a continuous downwardly projecting peripheral lip 28 along the external edge or collar portion thereof and with a pair of shallower transverse lip members 29a and 29b extending across the width of wall member 12. When the casing members are assembled to the wall member, these lip members serve to locate the casing members 13 and 14 in lighttight relation to wall member 12 by engagement with the peripheral flanges 22a and 22b on the casing members.

As best depicted in FIGURE 2, the casing members are provided with aligned film strip openings 31a and 31b. To prevent the passage of light into the film chambers through these openings, while allowing free movement of the film strip therethrough, curved inner wall members 32a and 32b are closely spaced from the adjacent inner surfaces of the casing members between the bottom walls thereof and wall member 12, to define narrow arcuate film channels extending between the film strip openings and the film chambers. As illustrated in FIGURE 3, the inner wall members preferably are formed integrally with wall member 12 and are supported along their lower edges in lighttight relation to the bottom wall members of the casings by slots as shown at 33b. Similarly, the edges of the inner wall members adjacent openings 31a and 31b are provided, respectively, with tongues 34a and 34b, which are received in supporting lighttight engagement in corresponding grooves 35a and 35b in the outer wall members of the film casings. By this arrangement, the film strip extends through the arcuate channels, which, although shown somewhat wider in FIGURES 2 and 3 for purposes of clarity, are actually only slightly wider than the thickness of the film strip. Even with such a construction, however, if the wall surfaces defining the channels are smooth, a minute but nonetheless unacceptable amount of light may reach the interior of the casings through the arcuate film channels by repeated grazing reflection between the film strip and the adjacent channel wall. To minimize this possibility, the adjacent wall surfaces defining the film channels are made substantially non-reflective of grazing light rays by means of light diffusing surface irregularities, for example a series of parallel notches, as shown at 36, defining serrate surfaces adjacent the film strip in the channels.

During assembly of the magazine, which is of course accomplished in darkness or non-actinic light, the flange portions of the film casing members are cemented or otherwise united with the mating surfaces of wall member 12 on one face or surface of the wall member to permanently seal the film chambers. The take-up chamber is later broken open to remove the film therefrom for processing, thereby destroying the expendable magazine. Also, during the assembly process, the loaded magazine is provided with appropriate indicia, on the top or the other face surface of wall member 12, as shown at 37 in FIGURE 1, indicating the type of film in the magazine and providing other information relating thereto, such as appropriate exposure value ratings. Such indicia may be printed or otherwise marked directly on wall member 12 or, preferably, may be provided by means of a label cemented to the magazine.

Figure 1:
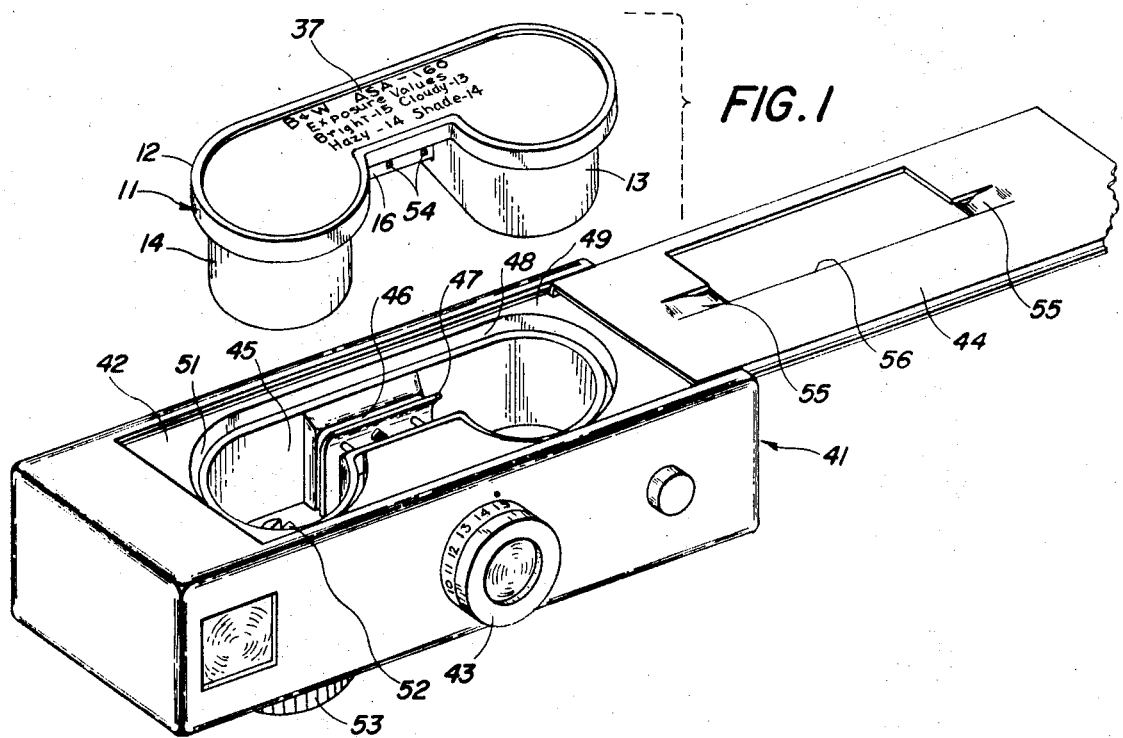
FIGURE 1 is a perspective view of a camera and film magazine according to a preferred embodiment of the invention, showing the magazine from the top in position for insertion into the camera.

FIGURE 1 shows a loaded magazine 11, as previously described, in proper position for insertion into a camera 41 comprising a body member 42, a lens assembly 43 and a magazine retaining slide member 44. As indicated generally by numeral 45, the camera body member includes wall means defining a magazine compartment adapted to receive the film supply and take-up casing members of the film magazine with the portion of film extending therebetween being supported within the compartment in the focal plane of the camera lens between a rearward film support platen 46 and a rearwardly biased aperture plate 47 resiliently engaging the film strip about the exposure area thereof. When the magazine is so received in the magazine compartment of the camera, the edge or collar portion of top wall member 12 is received within a corresponding recess 48 in the camera body member extending laterally beyond the magazine compartment therein, whereby top wall member 12 serves to close the compartment with the top face surface of the magazine being substantially flush with the surrounding camera body surface 49. When the magazine is so positioned, the previously mentioned peripheral lip 28, extending downwardly about the edge or collar portion of wall member 12, and beyond the peripheral flanges 22a and 22b of the film casing members, is received within a corresponding continuous slot 51 in recess 48 to further enhance the lighttight closure of the compartment by the wall member of the magazine. Thus, the installation of the magazine into the camera completely excludes light from the magazine compartment housing the otherwise unprotected portion of film between the magazine casings and thereby eliminates the need for a lighttight cover door on the camera. It should be apparent that arrangements other than the illustrated lip and slot structure could be employed to provide lighttight cooperation between the magazine wall member 12 and the mating surface of the camera body and that the wall member need not be of the particular shape shown in the drawings, provided the edge portion thereof extends beyond the film casings and beyond the intermediate portion of film to provide an effective light seal for the magazine compartment.

When the magazine is so installed in the camera, one of the key members 26 of the film winding core is engaged by a film winding spindle 52 associated with a winding mechanism, as illustrated by knob 53, to advance successive areas of film into exposure position between platen 46 and aperture plate 47. As shown at 54, the film strip may be provided with uniformly spaced perforations along one edge thereof, which cooperate with a metering pawl, not shown, associated with the film winding mechanism of the camera, to regulate the advancement of successive film areas into exposure position. Also, if desired, the magazine may be provided with tactile coding means adapted, upon installation of the magazine, to adjust an element of the camera as a function of a characteristic of the particular film in the magazine.

To retain the magazine in its proper position in the camera, the magazine retaining slide member 44 is slid into closed position, in which resilient fingers 55 thereof engage the top face surface of the magazine to bias the edge portion of wall member 12 against the mating surface of the camera body member. Such closing of the slide member also brings opening 56 therein into alignment with indicia 37 on the magazine so that such indicia may be observed by the photographer during use of the loaded camera. It is important to note, however, that the slide member does not comprise a lighttight door enclosing the magazine, but is simply a means for retaining the magazine in its loaded position, which, if desired, could be accomplished by other means such as by resilient clips or the like.

Although the invention has been described in considerable detail with reference to certain preferred embodiments thereof, it will be understood that variations and modifications can be effected within the spirit and scope of the invention as described hereinabove and as defined in the appended claims.

I claim:

1. A camera for using a double chamber film magazine comprising:
    (a) spaced film casings defining film chambers therein;
    (b) an elongate strip of film received at opposite ends thereof coiled about respective axes within said chambers with an intermediate portion of said film extending between said casings; and
    (c) a generally flat wall member adjacent corresponding axial ends of said casings, said wall member including continuous peripheral edge means defining a lip around the periphery of said wall member and overlapping the casings and said intermediate film portion at said axial ends;
   said camera comprising:
    (d) means defining a picture taking axis;
    (e) a body member including:
        (1) internal wall means defining an open ended magazine compartment to receive said casings and said intermediate film portion in a direction transverse to said picture taking axis, and
        (2) surface means surrounding the open end of said magazine compartment to cooperate with said peripheral edge portion of said wall member to contain the casings and intermediate film portion between the surface means and wall member and to provide a lighttight closure of said magazine compartment by said wall member when said magazine is positioned with said casings and said intermediate film portion received in said magazine compartment; and
    (f) retention means for releasably retaining said magazine in said camera.--

2. A camera according to Claim 1 having an objective and including film guiding means within said compartment for supporting said intermediate film portion in the focal plane of the objective when said magazine is positioned in said camera.

3. A camera according to Claim 1 in which said retention means defines an opening to permit at least a portion of said wall member to be visible from the camera exterior.

4. A double chamber film magazine for use in a photographic camera, the camera having means for receiving the magazine and for cooperating with the magazine to form a lighttight seal therewith, the magazine comprising:
   first and second spaced casings defining light-tight film chambers, each of said casings having two end portions and having means defining openings through which film can pass into and out of the chambers;
   connecting means joined to said casings at only one end portion of each casing, respectively, to form the magazine, said casings being spaced a predetermined distance by said connecting means and across which space film from one casing can pass to the other casing; and,
   sealing means on said connecting means for cooperating with the camera to form a light-tight seal for shielding film in the space between the casings from ambient light when the magazine is in the camera.

5. A double chamber film magazine for use with a camera having light sealing means adapted to cooperate with the magazine, the magazine comprising:

(a) an elongate film supply casing having two ends and defining a film supply chamber and a first longitudinal axis;

(b) an elongate film take-up casing having two ends and defining a film take-up chamber and a second longitudinal axis;

(c) an elongate strip of film wound at one end within said film supply chamber, and at the other end within said film take-up chamber with a portion of the film strip extending between said casings; and, (d) a rigid, light impermeable wall member having a face connected to each of said casings at only one end of each casing to rigidly support said casings with the first and second axes normal to the one face and in parallel spaced relation to each other, said wall member including peripheral light sealing means, said peripheral light sealing means including an edge portion extending normal to the one face around the portion of the film strip between the casings for cooperating with the camera light sealing means to define a light-tight seal between the magazine edge portion and the camera.

6. A double chamber film magazine for use in a camera, the camera having means defining a light sealing rib, the magazine comprising:

(a) a pair of spaced film casings defining chambers for receiving an elongate strip of film coiled therein, each of said chambers having an elongate body portion and an end portion; and (b) a connecting member joined to said casings at the end portions of the casings to form the magazine, said connecting member having a first substantially flat wall with a peripheral edge and a second wall extending substantially perpendicular to the first wall about the peripheral edge thereof, said second wall cooperating with each casing to define light sealing recess means therebetween for closely receiving the light sealing rib of the camera in a light-tight manner.

7. A double chamber film magazine for use with a camera having light sealing means, the magazine comprising:

(a) an elongated film supply casing including generally cylindrical wall surfaces defining a longitudinal axis and a film supply chamber open to the exterior of said film supply casing only through a first narrow elongate slot;

(b) an elongated film take-up casing including generally cylindrical wall surfaces defining a longitudinal axis and a film take-up chamber open to the exterior of said film take-up casing only through a second narrow elongate slot;

(c) casing support means supporting said casings in spaced relation with the axes parallel and said slots disposed in confronting alignment with each other;

(d) a generally flat wall member adjacent corresponding ends of said casings and substantially normal to the axes thereof, said wall member having a main portion connecting the casings and peripheral light sealing means, said peripheral light sealing means including an edge portion extending normal to said main portion and parallel to the axes of the casings for cooperating with the camera light sealing means and to define a light seal between the magazine edge portion and the camera.

8. A film magazine according to Claim 6 wherein the second wall is continuous and extends entirely around the peripheral edge of the wall member.